(12) United States Patent
Bryant et al.

(10) Patent No.: US 9,474,040 B2
(45) Date of Patent: Oct. 18, 2016

(54) INDEPENDENTLY VERIFYING A TRANSIT POINT IN A NETWORK ENVIRONMENT

(71) Applicant: CISCO TECHNOLOGY, INC., San Jose, CA (US)

(72) Inventors: Stewart Frederick Bryant, Surrey (GB); Christian Cassar, England (GB); Willem Maria Verrydt, Ickenham (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 2 days.

(21) Appl. No.: 14/508,907

(22) Filed: Oct. 7, 2014

(65) Prior Publication Data

US 2016/0100377 A1    Apr. 7, 2016

(51) Int. Cl.
*H04W 64/00* (2009.01)

(52) U.S. Cl.
CPC .................... *H04W 64/00* (2013.01)

(58) Field of Classification Search
CPC .... H04W 64/00; G01C 21/22; G01S 13/931; G01S 1/02; G08G 1/16; G06G 7/78
USPC ........................ 701/300; 455/456.1
See application file for complete search history.

(56) References Cited

U.S. PATENT DOCUMENTS

| | | | |
|---|---|---|---|
| 5,510,801 A | 4/1996 | Engelbrecht et al. | |
| 5,754,657 A * | 5/1998 | Schipper | G01S 19/16 342/357.29 |
| 6,026,304 A | 2/2000 | Hilsenrath et al. | |
| 6,108,555 A | 8/2000 | Maloney et al. | |
| 6,161,018 A * | 12/2000 | Reed | G01S 5/0252 342/457 |
| 6,281,832 B1 * | 8/2001 | McElreath | G01S 13/94 340/963 |
| 6,298,043 B1 | 10/2001 | Mauger et al. | |
| 7,295,556 B2 | 11/2007 | Roese et al. | |
| 7,398,069 B2 * | 7/2008 | Sample | H03J 1/0058 340/905 |
| 7,477,986 B1 * | 1/2009 | Young | G01C 21/16 701/300 |
| 7,577,421 B2 * | 8/2009 | Gould | B60R 25/00 340/990 |
| 7,663,537 B2 * | 2/2010 | Suzuki | G01S 3/74 342/118 |
| 7,924,730 B1 | 4/2011 | McAllister et al. | |
| 8,018,383 B1 | 9/2011 | Schantz et al. | |
| 8,032,409 B1 * | 10/2011 | Mikurak | G06Q 10/00 705/14.39 |
| 8,107,400 B2 | 1/2012 | Traynor et al. | |
| 8,239,483 B2 | 8/2012 | Thomson et al. | |

(Continued)

*Primary Examiner* — Atul Trivedi
(74) *Attorney, Agent, or Firm* — Patent Capital Group

(57) ABSTRACT

An example method for independently verifying a transit point in a network environment is provided and includes receiving, at a transit point in a packet network, at least two radio signals from corresponding different radio sources, receiving, at the transit point, a sampling request in an packet message, and transmitting in another packet message a sample of the at least two radio signals such that by comparing the sample with an expected sample, a location of the transit point is determined. The expected sample can comprise another sample of the at least two radio signals that would have been received by the transit point at an expected location at a time of receipt of the sampling request, and if the expected sample matches the sample, the transit point is determined to be at the expected location.

20 Claims, 5 Drawing Sheets

(56) References Cited

U.S. PATENT DOCUMENTS

| | | | | |
|---|---|---|---|---|
| 8,391,886 B1* | 3/2013 | Thaper | H04M 3/42348 | 455/414.1 |
| 8,755,767 B2* | 6/2014 | Maier | H04W 4/005 | 340/501 |
| 8,831,514 B2* | 9/2014 | Tysowski | H04W 4/001 | 455/41.1 |
| 2004/0131125 A1* | 7/2004 | Sanderford, Jr. | H04L 5/06 | 375/261 |
| 2006/0031438 A1* | 2/2006 | Tokuhashi | H04N 21/643 | 709/223 |
| 2006/0178918 A1* | 8/2006 | Mikurak | G06Q 10/06 | 705/7.25 |
| 2006/0291657 A1* | 12/2006 | Benson | G05B 13/0275 | 380/270 |
| 2007/0022469 A1* | 1/2007 | Cooper | H04K 1/00 | 726/3 |
| 2008/0069032 A1* | 3/2008 | Liu | H04W 24/06 | 370/328 |
| 2010/0217525 A1* | 8/2010 | King | G06Q 30/02 | 701/300 |
| 2012/0072100 A1* | 3/2012 | Mate | H04W 4/026 | 701/300 |
| 2012/0105474 A1* | 5/2012 | Cudalbu | H04W 4/02 | 345/633 |
| 2012/0170548 A1* | 7/2012 | Rajagopalan | H04W 36/22 | 370/331 |
| 2014/0162688 A1* | 6/2014 | Edge | H04W 8/005 | 455/456.1 |
| 2014/0295786 A1* | 10/2014 | Maier | H04W 4/22 | 455/404.2 |
| 2015/0140954 A1* | 5/2015 | Maier | H04W 4/22 | 455/404.2 |

\* cited by examiner

INDEPENDENTLY VERIFYING A TRANSIT POINT IN A NETWORK ENVIRONMENT

TECHNICAL FIELD

This disclosure relates in general to the field of communications and, more particularly, to independently verifying a transit point in a network environment.

BACKGROUND

Location and positioning systems are increasingly being used to determine locations of various network devices, such as mobile cellular phones and global positioning systems (GPS) devices. Moreover, information concerning the geographic location of a network node may be useful for any number of reasons, including verifying network paths through the network node, customized content delivery, and combating fraud. A part of networking research is geared towards developing systems and technologies that can help to automatically locate people and equipment. Many such systems and technologies have been developed over the years; because each such approach solves different problems or supports different applications, they vary widely in many parameters, such as physical phenomena used for location determinations, form factors of sensing apparatus, use of infrastructure and portable elements, and resolution in time and space.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for independently verifying a transit point in a network environment is provided and includes receiving, at a transit point in a packet network, at least two radio signals from corresponding different radio sources, receiving, at the transit point, a sampling request in a packet message, and transmitting in another packet message, a sample (e.g., portion, model, slice, part, etc.) of the at least two radio signals such that by comparing the sample with an expected sample, a location of the transit point is determined. The expected sample can comprise another sample of the at least two radio signals that would have been received by the transit point at an expected location at a time of receipt of the sampling request, and if the expected sample matches the sample, the transit point is determined to be at the expected location.

As used herein, the term "radio signal" comprises an electromagnetic signal that is transmitted wirelessly through the atmosphere or free space. In contrast, a "packet message" includes a non-radio signal that is carried over a packet network such as Ethernet, IP or Multiprotocol Label Switching (MPLS) network according to corresponding protocols (e.g., as specified by relevant standards organizations such as Internet Engineering Task Force (IETF) or Institute for Electrical and Electronics Engineers (IEEE)). In a general sense, a packet network comprises a packet-switched network, in which all transmitted data, regardless of content, type, or structure, is formatted into suitably sized blocks called packets.

Example Embodiments

Figure 1:
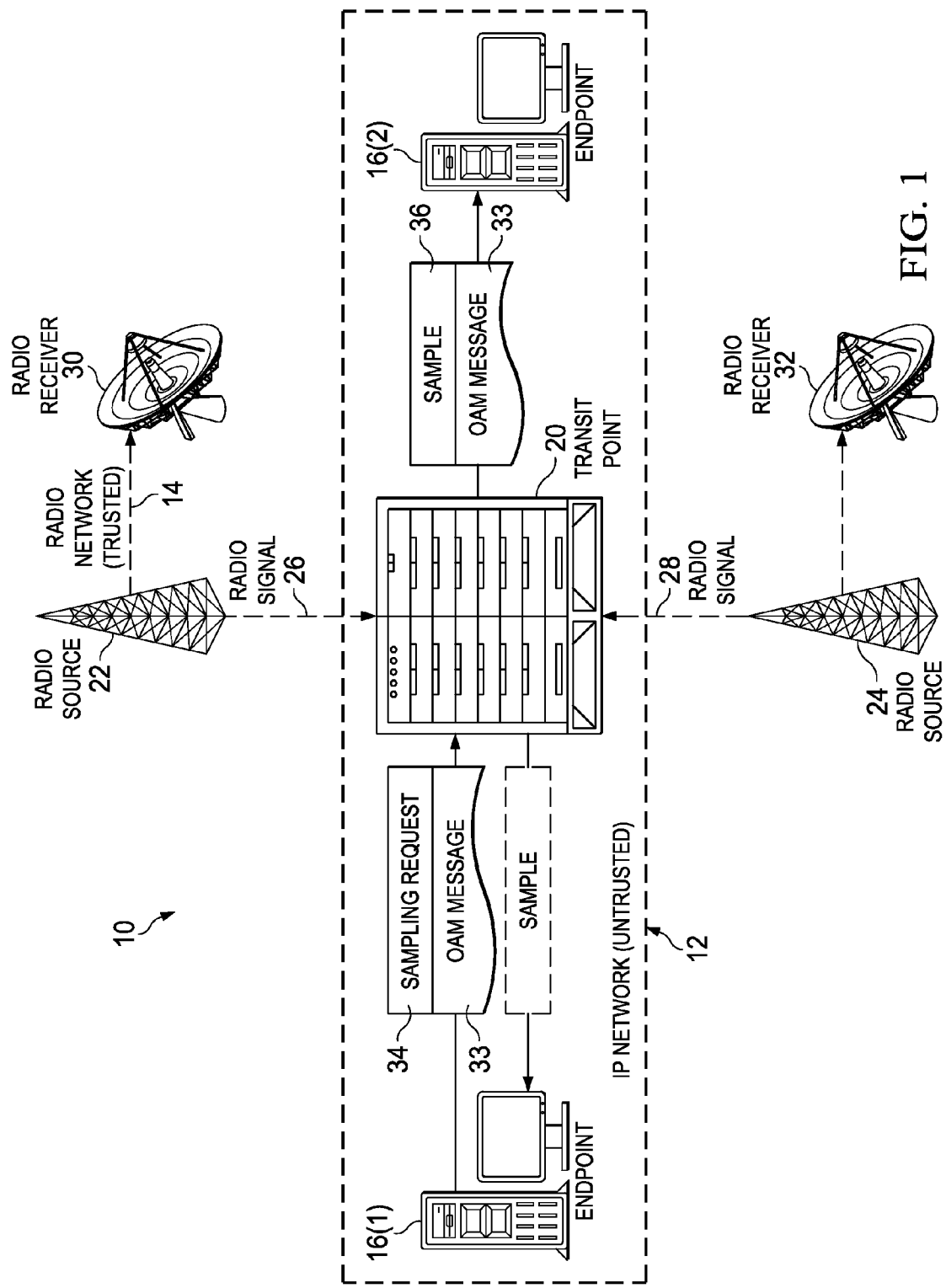
FIG. 1 is a simplified block diagram illustrating a communication system for independently verifying a transit point in a network environment.

Turning to FIG. 1, FIG. 1 is a simplified block diagram illustrating a communication system 10 for independently verifying a transit point in a network environment in accordance with one example embodiment. FIG. 1 illustrates an untrusted packet network 12 and a separate trusted radio network 14. Note that packet network 12 and radio network 14 use independent, disjoint communication protocols, such that communication signals from one network cannot be propagated, intercepted, or interpreted according to protocols of the other network. For example, radio network 14 uses modulation of radio waves (e.g., modulation of frequency, amplitude, or phase) to transmit information; in contrast, packet network 12 uses digital data streams according to packet-based protocols, including headers, payload, etc. to transmit information. Further, although the figure indicates an IP network, any packet network, including Multiprotocol Label Switching (MPLS) network and Ethernet network, may be included within the broad scope of the embodiments.

Packet network 12 may include one or more endpoints, such as 16(1) and 16(2), which comprise any suitable network element. Embodiments of communication system 10 can independently (e.g., without reliance on packet network 12) verify that a network path (e.g., network connection between endpoints 16(1) and 16(2)) goes through a network element, such as a transit point 20, at a particular geographic place. In other words, embodiments of communication system 10 can independently verify a geographic location of transit point 20. In a general sense, the term "transit point" refers to a network element located at an intermediate position between two geographical locations.

To facilitate the independent verification, at least two different radio sources, 22 and 24 are used to generate respective radio signals 26 and 28 in radio network 14. Two different radio receivers 30 and 32 may receive radio signals 26 and 28, respectively. Distances of radio receivers 30 and 32 to an expected location of transit point 20 may be known apriori. Endpoint 16(1) may send an packet message, such as an operations and maintenance (OAM) message 33 to endpoint 16(2) through transit point 20. The OAM message may embed a sampling request 34 to transit point 20.

Transit point 20 may be equipped to receive the OAM message and on detection of sampling request 34, substantially simultaneously sample the off-air radio signals 26 and 28 from both radio sources 22 and 24 and generate a message including a reference to sampling request 34, an agreed number of bits (e.g., 256 bits) from each of radio signals 26 and 28 to comprise a sample 36, together with any other agreed elements of the protocol. Transit point 20 may send sample 36 to endpoint 16(2) in some embodiments; in other embodiments, transit point 20 may send sample 36 back to endpoint 16(1). The recipient of sample 36 (e.g., endpoint 16(1) or 16(2)) may compare sample 36 with an expected sample based on radio signals received at radio receivers 30 and 32, and verify the geographic location of transit point 20.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

An organization deploying or purchasing network transit may wish to audit that a path transits a particular geographical place. For example, it may be desirable to independently verify that two paths are physically disjoint. In another example, legal or contractual restrictions may require that a particular country be avoided in the network path. Sometimes, consulting a deployment plan or simply asking a transit provider may not be sufficient (e.g., if the deployment plan or transit provider is not trustworthy). In some cases, the transit provider may not be sure of the exact network path; the network path may be accidently reconfigured after or during network maintenance. Transit providers may lie about the network path for economic or political reasons.

In some scenarios, diversity of network paths may be determined based on time of flight; however such mechanisms can lack independent verification. The use of radio systems including pulsed based radio systems in navigation (e.g., to locate a particular equipment) is well known. The integration of radio and wireline transmission systems for location sensing is also well known. However, such mechanisms can be interfered with by the transit provider (e.g., through network elements in the network of the equipment being located), and such interference may reduce the quality and authenticity of the audit results.

Communication system 10 is configured to address these issues (among others) to offer a system and method for independently verifying a transit point in a network environment. According to various embodiments, transit point 20 in untrusted packet network 12 may receive at least two radio signals 26 and 28 from corresponding different radio sources 22 and 24, respectively in trusted radio network 14. Radio signals 26 and 28 may comprise pseudo-random digitally encoded bit-streams, such as signals of opportunity. In many embodiments, transit point 20 may store radio signals 26 and 28 as a bit-stream in a sampling register at transit point 20. In various embodiments, radio signals 26 and 28 may include a random bit-stream that are each independently recordable at radio receivers 30 and 32, respectively.

Radio receivers 30 and 32 may be configured to send information to endpoint 16(1) (or 16(2)) by any suitable mechanism known in the art. An example of a suitable radio signal comprises an encrypted television signal. Note that if radio sources 22 and 24 comprise geo-synchronous satellites, they may be chosen to be close to opposite horizons. If radio sources 22 and 24 comprise terrestrial radio transmitters, three transmitters may be used such that transit point 20 is in the middle of a triangle formed by the three radio sources.

Transit point 20 may receive a sampling request 34 in a packet message, such as OAM message 33, from endpoint 16(1) in packet network 12. Sampling request 24 may include a number of bits to be included in a response to the request. Transit point 20 may retrieve a portion of the stored radio signals to generate sample 36. Transit point 20 may transmit, in another packet message, sample 36 of radio signals 26 and 32 such that by comparing sample 36 with an expected sample, a location of transit point 20 is determined. In some embodiments, sample 36 may be transmitted to another endpoint 16(2) different from endpoint 16(1) that sent sampling request 34. In other embodiments, sample 36 may be transmitted to the same endpoint 16(1) that sent sampling request 34.

The expected sample includes another sample of radio signals 26 and 28 that would have been received by transit point 20 at an expected location at a time of receipt of sampling request 34. If the expected sample matches sample 36, transit point 20 may be determined to be at the expected location. Comparison between sample 36 and the expected sample and a delay in receiving sample 36 after sampling request 34 was sent (e.g., by endpoint 16(1)) may be used to calculate a deviation of the location of transit point 20 with respect to the expected location.

In some embodiments, a user (e.g., human operator) may independently calculate the expected sample based on radio signals received at radio receiver 30 and 32, and store the expected sample at endpoint 16(2) (or 16(1)) for comparison calculations. In other embodiments, endpoint 16(2) (or 16(1)) receives from radio receivers 30 and 32 the set of bits that transit point 20 was expected to receive at the time of receipt of sampling request 34. Endpoints 16(2) (or 16(1)) may receive the radio signals through continuous monitoring and relay, relay after the fact, dead reckoning, or any other suitable mechanism. In various embodiments, radio receivers 30 and 32 may compensate for their relative distances from the expected location of transit point 20 by capturing and relaying a sufficiently large message stream sample that endpoint 16(2) (or 16(1)) can use to compensate, in turn, for various allowed uncertainties in the sampling system.

Endpoint 16(2) (or 16(1)) may use at least the following measured information for location verification: (1) digital radio sample 36 of radio signals 26 and 28 received at transit point 20; (2) radio sample received at radio receiver 30; (3) radio sample received at radio receiver 32; and (4) time taken for sampling request 34 to propagate through packet network 12 from endpoint 16(1), be processed by transit point 20 to generate sample 36 and for sample 36 to be transmitted to endpoint 16(2) (or 16(1)). Given that endpoint 16(2) (or 16(1)) knows the position of radio receivers 30 and 32, and positions of radio sources 22 and 24, endpoint 16(2) (or 16(1)) can confirm that sample 36 is consistent with the expected relative distances of transit point 20, radio receivers 30 and 32, from radio sources 22 and 24. The relative distance from endpoints 16(1) and 16(2) to the actual location of transit point 20 via the packet network path may also be known, although the information may be less reliable than the radio paths. The information may be sufficient to resolve the location of transit point 20 to at least a town-level.

In various embodiments, data rate of radio signals captured at transit point 20 (or radio receivers 30 and 32) can have a direct impact on a resolution of the sampling system as described herein. For example, a 20 Mb/s signal has a per bit time of 50 ns, which is sufficient for a distance resolution of about 50 feet (e.g., applicable for most diversity verification applications). Bit rate can be traded against distance resolution. Thus, lower bit rate can result in lower resolution, and vice versa. Note that, in various embodiments, the distance resolution of the operations as described herein may be at a town or city level rather than a building level. In a general sense, the more precise the desired location resolution, the more accurate would be the timing requirement.

It may be adequate in many applications to confirm the location of transit point 20 to a city, rather than a building (or even finer resolutions). Such relaxation of the geographic accuracy could lead to a relaxation of the required timing accuracy and hence to a reduction of the implementation cost. Thus, there may be advantages in cost and choice of external radio source if the user was content with resolving to an area the size of a city, or even a country, rather than a building or a street. Also, further verification can be obtained by also making time or distance measurements between endpoints 16(2) (or 16(1)) and transit point 20.

In some embodiments, OAM message 33 may be composed at pre-determined times according to a precision timer at endpoint 16(1) and autonomously sent (e.g., without human intervention). Terrestrial transmitters with suitable radio signals may be used exclusively or in conjunction with satellite transmitters, with a requirement that an independent observer can hear the same transmission and the random bit-stream comprising the radio signal is of sufficiently high bandwidth to satisfy the range (e.g., distance) resolution. If transit point 20 is triangulated by three transmitters or two transmitters and packet network 12, faking its location beyond a response time uncertainty may not be possible as the radio samples would be inconsistent with those received at monitoring sites (e.g., radio receivers 30 and 32). A vulnerability can arise when radio sources 22 and 24 are geosynchronous satellites and transit point is moved on a line equidistant from the two satellites. However, such a scenario would require the faker to delay one of radio signals 26 and 28 and explain both the unexpected delay of radio signals 26 and 28 and delay in the network signal (e.g., between sampling request 35 and sample 36).

In various embodiments, OAM message 33 may be used to trigger sampling of at least two pseudo random digitally encoded radio signals 26 and 28 received at transit point 20. By comparing the received sequence of bits with those independently received at a known location (e.g., radio receivers 30 and 32), and the delay of the OAM response, the approximate location of transit point 20 can be determined. By basing the sampling and measurements on reception of signals external to untrusted packet network 12, it is possible to audit the location of a key node, such as transit point 20, without trusting packet network 12 being measured.

In some embodiments, a fast response, or a response outside expected time bounds can prove that some physical transit paths are not being followed. For example, if the falsification was to take a shorter path than expected, a judicious choice of radio sources (e.g., one that is closer to transit point 20 than the suspected shortcut) may address the falsification. For example, one could imagine a cheat moving to a path closer to the equator to cheat on a system with geosynchronous references, but if one of the radio sources is a terrestrial or a polar orbiting source, cheating would be much harder.

Embodiments of communication system 10 can be used in a variety of scenarios, such as business integrity verification (e.g., verification that business critical path diversity is being followed); verification that a path is geographically constrained (e.g., based on international treaties and embargos); auditing the location of a router on a data path; verifying the location of a server interface (e.g., to validate that a server was in the legally required geography); lightweight authentication approach in Internet of Things (e.g., using inbound radio signals as part of the authentication process); etc.

Turning to the infrastructure of communication system 10, the network topology of packet network 12 and radio network 14 can include any number of radio sources, radio receivers, servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area network (e.g., the Internet).

In various embodiments, the measurements and calculations in transit point 20 and endpoints 16(1), 16(2) may be implemented as a combination of hardware and software in the respective network elements. In some embodiments, the measurements and calculations may be implemented exclusively as hardware, and in some other embodiments, exclusively as software. In some other embodiments, the measurements and calculations may be implemented in an external appliance (e.g., server) and suitably attached to corresponding network elements, namely transit point 20 and endpoints 16(1), 16(2). Note that transit point 20 may comprise any suitable network element capable of performing network switching operations, among other network operations.

As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Endpoints 16(1), 16(2) may comprise any suitable network element that can terminate a network path, including servers such as rack servers, blade servers, bare-metal servers; applications; computing devices; etc. configured with suitable hypervisors and other software components to facilitate executing the calculations thereon. In some embodiments, different radio sources 22 and 28 may comprise two different satellites at approximately opposite horizons. In other embodiments, different radio sources 22 and 28 may comprise terrestrial radio signal transmitters. In yet other embodiments, different radio sources 22 and 28 may comprise a combination of satellites and terrestrial radio signal transmitters.

Figure 2:
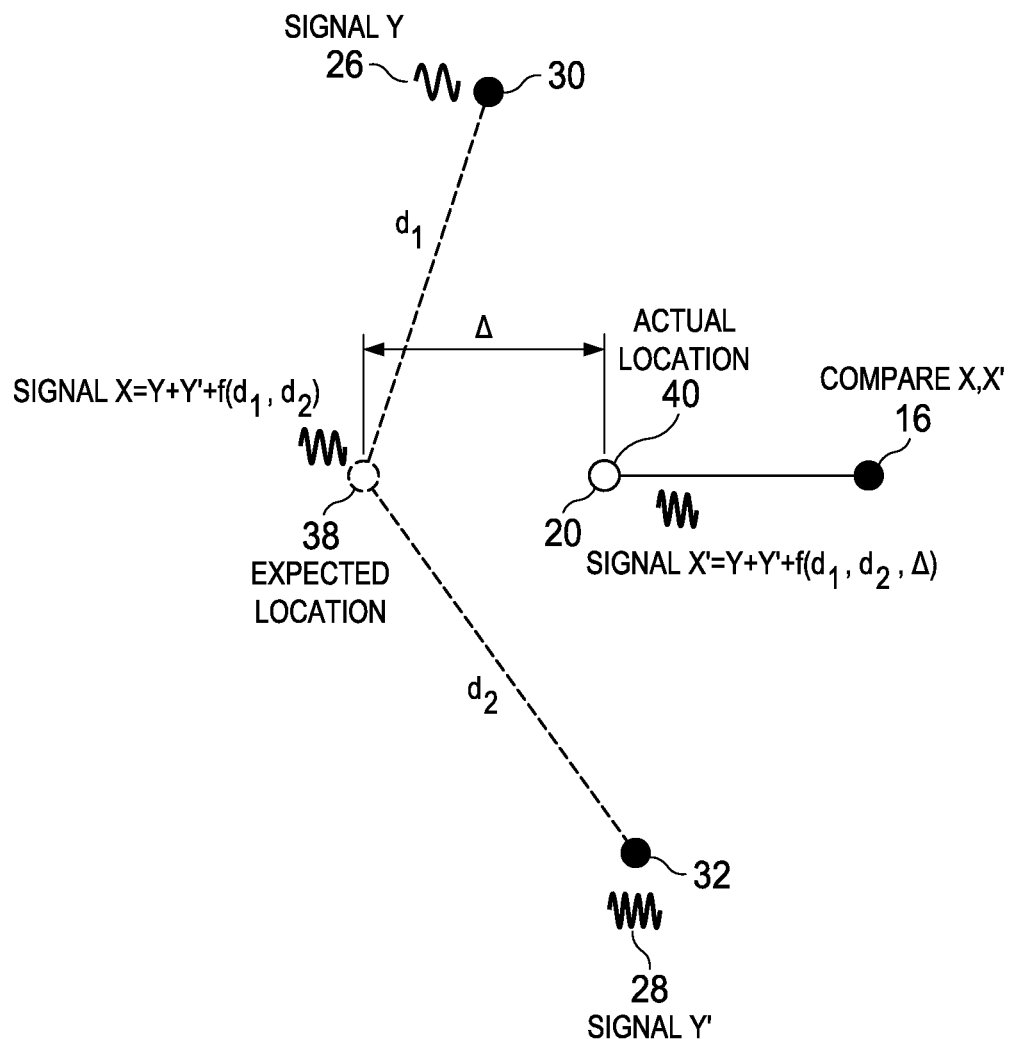
FIG. 2 is a simplified block diagram illustrating example details of embodiments of the communication system.

Turning to FIG. 2, FIG. 2 is a simplified block diagram illustrating example details according to an embodiment of communication system 10. Transit point 20 may be expected to be located at an expected location 38 (e.g., based on information available from untrusted packet network 12). An actual location 40 of transit point 20 may be different from expected location 38. Assume that radio receivers 30 and 32 are at known distances $d_1$ and $d_2$, respectively, from expected location 38. If radio receiver 30 receives radio signal 26 as signal Y, and radio receiver 32 receives radio signal 28 as signal Y,' transit point 20 would receive a signal differing according to the relative distances of radio receivers 30 and 32 from transit point 20. Thus, transit point 20 would receive a signal $X=f(Y, d_1)+f(Y'+d_2)$, where f is some known function. However, if transit point 20 is at actual location 40, the signal it would receive, namely, $X'=f(Y, d1, \Delta)+f(Y', d_2, \Delta)$, from radio receivers 30 and 32 would be different from X, according to the deviation A from expected location 38. Thus, at endpoint 16, when X and X' are compared, the deviation A from expected location 38 may be determined appropriately.

Figure 3:
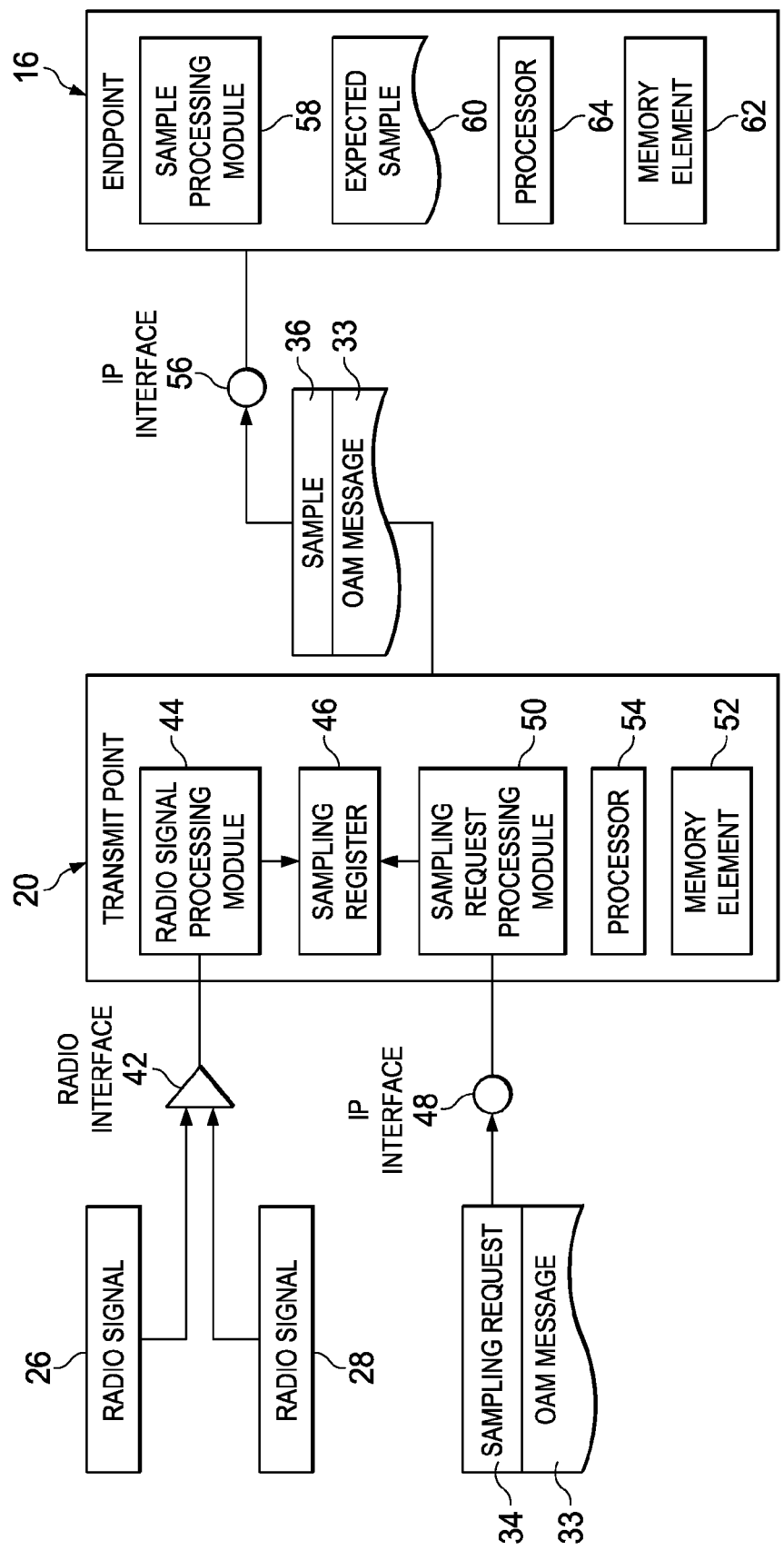
FIG. 3 is a simplified block diagram illustrating other example details of embodiments of the communication system.

Turning to FIG. 3, FIG. 3 is a simplified block diagram illustrating example details according to an embodiment of communication system 10. Transit point 20 may be equipped with a radio interface 42 that can receive radio signals 26 and 28. A radio signal processing module 44 in transit point 20 may store radio signals 26 and 28 as bit-streams in a sampling register 46. An IP interface 48 at transit point 20 may receive OAM message 33 including sampling request 34. Note that radio interface 42 cannot receive or interpret packet messages such as OAM message 33; nor can IP interface 48 receive or interpret radio signals 26 and 28.

A sampling request processing module 50 at transit point 20 may detect sampling request 34, and retrieve a portion of the stored radio signals from sampling register 46 to generate sample 36. Sample 36 may be tagged with an identifier of sampling request 34 (e.g., to indicate an association between sampling request 34 and sample 36) and embedded into OAM message 33 before forwarding on to endpoint 16. A memory element 52 and a processor 54 may facilitate the operations of transit point 20.

Endpoint 16 may include an IP interface 56 that can receive OAM message 33 with sample 36. A sample processing module 58 may extract sample 36, and compare it with an expected sample 60 stored thereat. In some embodiments, expected sample 60 may be programmed at endpoint 16 by a user; in other embodiments, endpoint 16 may be configured with appropriate interfaces and other modules to receive signals from radio receivers 30 and 32 that indicate expected sample 60, after compensating for known distances between radio receivers 30, and 32 from an expected location of transit point 20. A memory element 62 and a processor 64 may facilitate the operations of endpoint 16.

Figure 4:
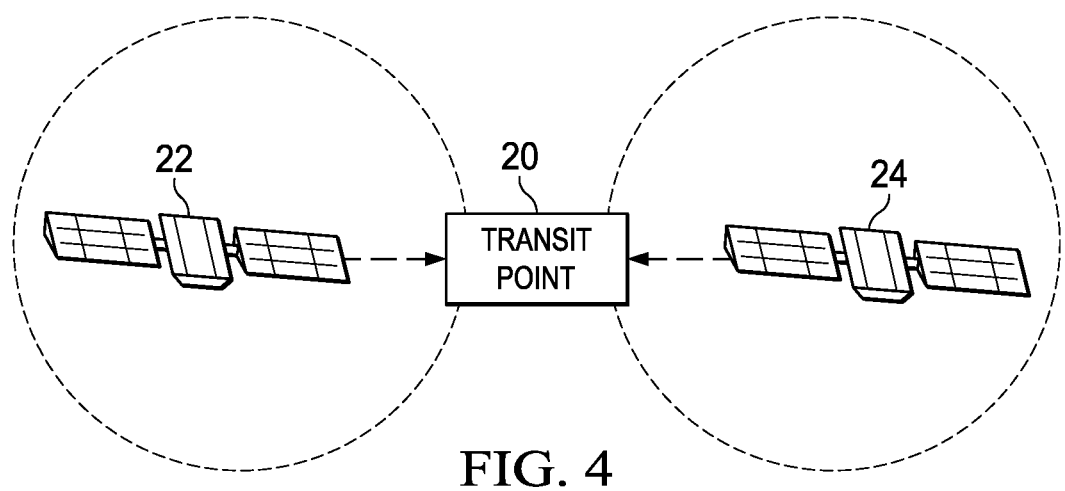
FIG. 4 is a simplified block diagram illustrating yet other example details of embodiments of the communication system.

Turning to FIG. 4, FIG. 4 is a simplified block diagram illustrating example details of an embodiment of communication system 10. According to an embodiment, radio sources 22 and 24 may comprise geostationary satellites located at approximately opposite horizons from transit point 20.

Figure 5:
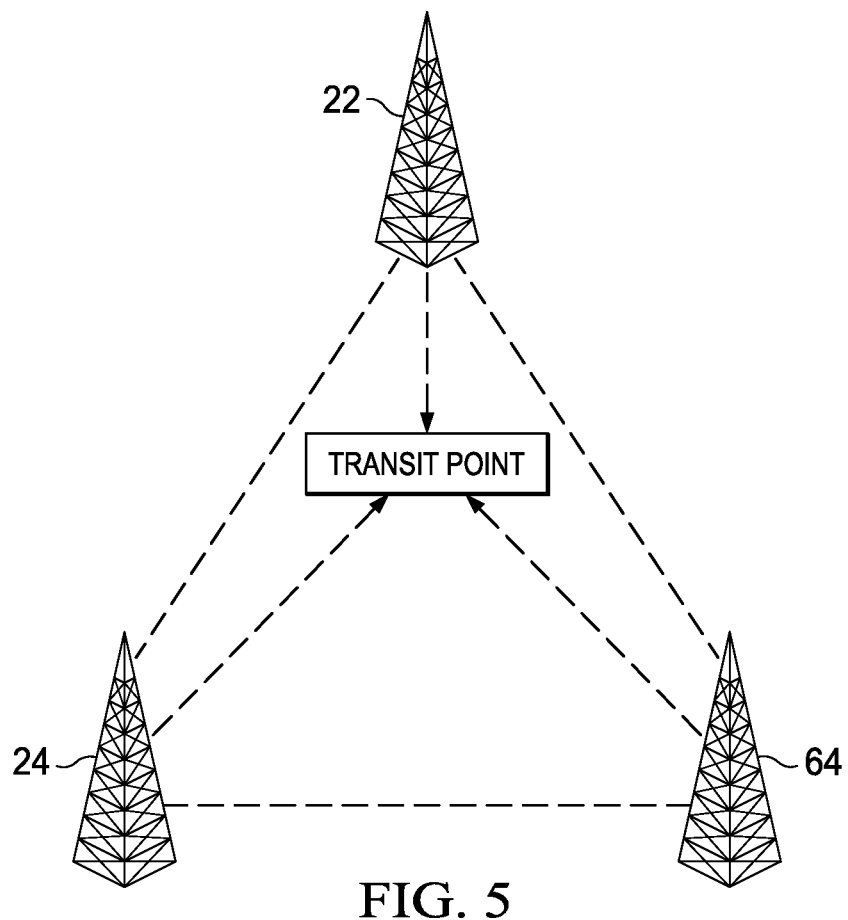
FIG. 5 is a simplified block diagram illustrating yet other example details of embodiments of the communication system.

Turning to FIG. 5, FIG. 5 is a simplified block diagram illustrating example details of an embodiment of communication system 10. According to an embodiment, radio sources 22, 24 and 64 may comprise three corners of a triangle, with transit point 20 located approximately in the middle (e.g., equidistant from the three radio sources).

Figure 6:
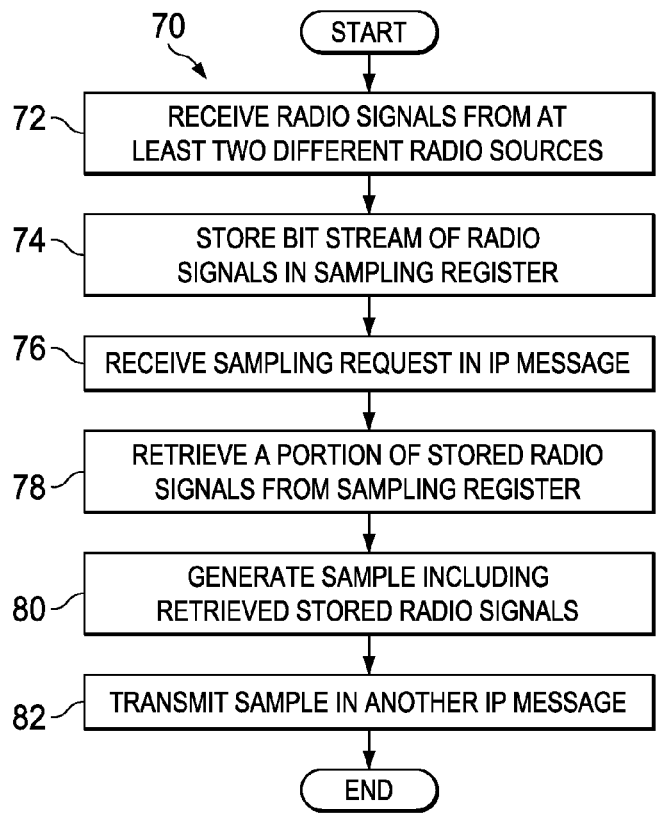
FIG. 6 is a simplified flow diagram illustrating example operations that may be associated with an embodiment of the communication system.

Turning to FIG. 6, FIG. 6 is a simplified flow diagram illustrating example operations 70 that may be associated with an embodiment of communication system 10. At 72, transit point 20 may receive radio signals 26 and 28 from at least two different radio sources 22 and 24, respectively. At 74, transit point 20 may store the bit-streams of radio signals 26 and 28 in sampling register 46. At 76, transit point 20 may receive sampling request 34 in a packet message (e.g., IP message), such as OAM message 33 from endpoint 16 in packet network 12. At 78, transit point 20 may retrieve a portion of the stored radio signals from sampling register 46. At 80, transit point 20 may generate sample 36 including retrieved stored radio signals. At 82, transit point 20 may transmit sample 36 in another packet message (e.g., IP message) to endpoint 16.

Figure 7:
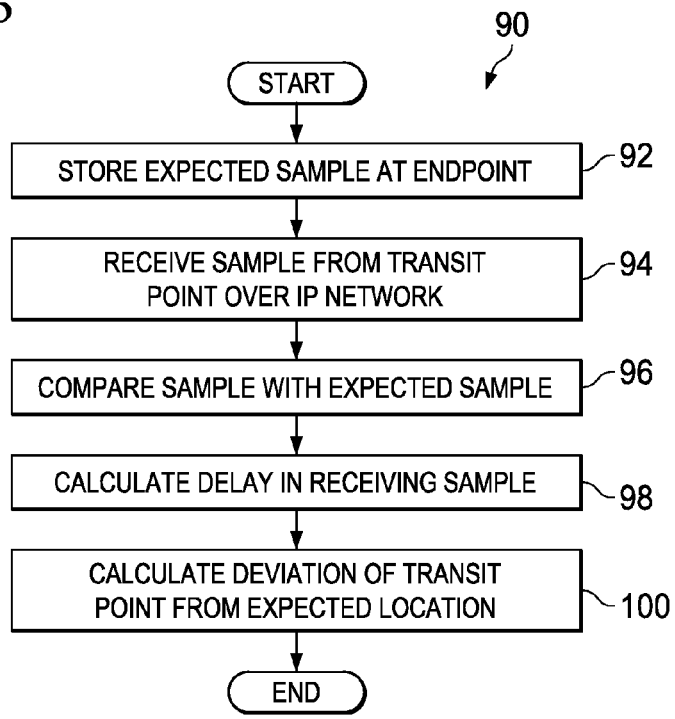
FIG. 7 is a simplified flow diagram illustrating other example operations that may be associated with an embodiment of the communication system.

Turning to FIG. 7, FIG. 7 is a simplified flow diagram illustrating example operations 90 that may be associated with an embodiment of communication system 10. At 92, endpoint 16 may store expected sample 60. At 94, endpoint 16 may receive sample 36 from transit point 20 over packet network 12. At 96, endpoint 16 may compare sample 36 with expected sample 60. At 98, endpoint may calculate a delay in receiving sample 36 (e.g., after sampling request 34 was sent out). At 100, endpoint 16 may calculate a deviation of transit point 20 from expected location 38.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, transit point 20 and endpoint 16. In some embodiments, one or more of these features may be implemented in hardware, provided external to these elements, or consolidated in any appropriate manner to achieve the intended functionality. The various network elements (e.g., transit point 20 and endpoint 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, transit point 20 and endpoint 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 52, 62) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 54, 64) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, at a transit point, at least two radio signals from corresponding different radio sources over a radio network;
receiving, at the transit point, a sampling request in a packet message from a first endpoint over a packet network; and
transmitting in another packet message to a second endpoint over the packet network a sample of the at least two radio signals such that by comparing the sample with an expected sample, a location of the transit point is determined.

2. The method of claim 1, wherein the expected sample comprises another sample of the at least two radio signals that would have been received by the transit point at an expected location at a time of receipt of the sampling request, wherein if the expected sample matches the sample, the transit point is determined to be at the expected location.

3. The method of claim 2, wherein the comparison between the sample and the expected sample and a delay in receiving the sample after the sampling request was sent are used to calculate a deviation of the location of the transit point with respect to the expected location.

4. The method of claim 1, wherein the sampling request is sent to the transit point in an operations and maintenance (OAM) message by a network endpoint over the packet network.

5. The method of claim 1, further comprising:
storing the at least two radio signals in a sampling register at the transit point;
storing a reference to the sampling request; and
retrieving a portion of the stored radio signals and the reference to the sampling request to generate the sample.

6. The method of claim 1, wherein the at least two radio signals comprise pseudo-random digitally encoded bit-streams.

7. The method of claim 1, wherein each of the at least two radio signals comprise a different signal of opportunity including a random bit-stream.

8. The method of claim 1, wherein the packet network is untrusted.

9. The method of claim 1, wherein the different radio sources comprise two different satellites at mutually opposing horizons.

10. The method of claim 1, wherein the different radio sources comprise terrestrial radio signal transmitters.

11. Non-transitory tangible media that includes instructions for execution, which when executed by a processor, is operable to perform operations comprising:
receiving, at a transit point, at least two radio signals from corresponding different radio sources over a radio network;
receiving, at the transit point, a sampling request in a packet message from a first endpoint over a packet network; and
transmitting in another packet message to a second endpoint over the packet network a sample of the at least two radio signals such that by comparing the sample with an expected sample, a location of the transit point is determined.

12. The media of claim 11, wherein the expected sample comprises another sample of the at least two radio signals that would have been received by the transit point at an expected location at a time of receipt of the sampling request, wherein if the expected sample matches the sample, the transit point is determined to be at the expected location.

13. The media of claim 12, wherein the comparison between the sample and the expected sample and a delay in receiving the sample after the sampling request was sent are used to calculate a deviation of the location of the transit point with respect to the expected location.

14. The media of claim 11, wherein the sampling request is sent to the transit point in an OAM message by a network endpoint over the packet network.

15. The media of claim 11, wherein the operations further comprise:
storing the at least two radio signals in a sampling register at the transit point;
storing a reference to the sampling request; and
retrieving a portion of the stored radio signals and the reference to the sampling request to generate the sample.

16. An apparatus, comprising:
a memory element for storing data; and
a processor, wherein the processor executes instructions associated with the data, wherein the processor and the memory element cooperate, such that the apparatus is configured for:
receiving, at a transit point, at least two radio signals from corresponding different radio sources over a radio network;
receiving, at the transit point, a sampling request in a packet message from a first endpoint over a packet network; and
transmitting in another packet message to a second endpoint over the packet network a sample of the at least two radio signals such that by comparing the sample with an expected sample, a location of the transit point is determined.

17. The apparatus of claim 16, wherein the expected sample comprises another sample of the at least two radio signals that would have been received by the transit point at an expected location at a time of receipt of the sampling request, wherein if the expected sample matches the sample, the transit point is determined to be at the expected location.

18. The apparatus of claim 17, wherein the comparison between the sample and the expected sample and a delay in receiving the sample after the sampling request was sent are used to calculate a deviation of the location of the transit point with respect to the expected location.

19. The apparatus of claim 16, wherein the sampling request is sent to the transit point in an OAM message by a network endpoint over the packet network.

20. The apparatus of claim 16, further configured for:
storing the at least two radio signals in a sampling register at the transit point;
storing a reference to the sampling request; and
retrieving a portion of the stored radio signals and the reference to the sampling request to generate the sample.

* * * * *